PERCENT OF LIGHT SENSITIVE AREA IN FOCAL AREA WHEN LIGHT SOURCE IS LOCATED AT VARIOUS HORIZONTAL AND VERTICAL ANGLES RELATIVE TO THE OPTICAL AXIS

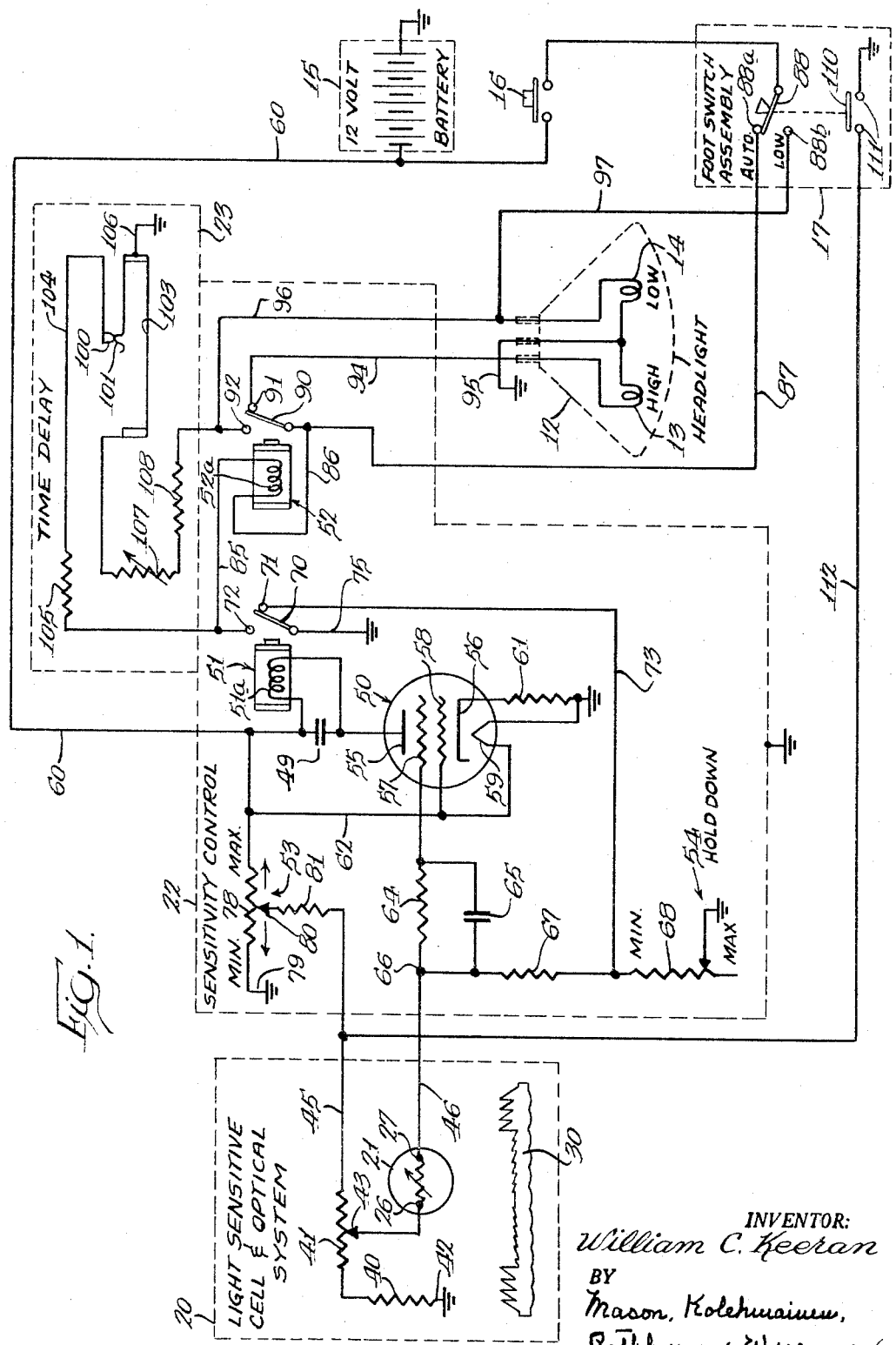

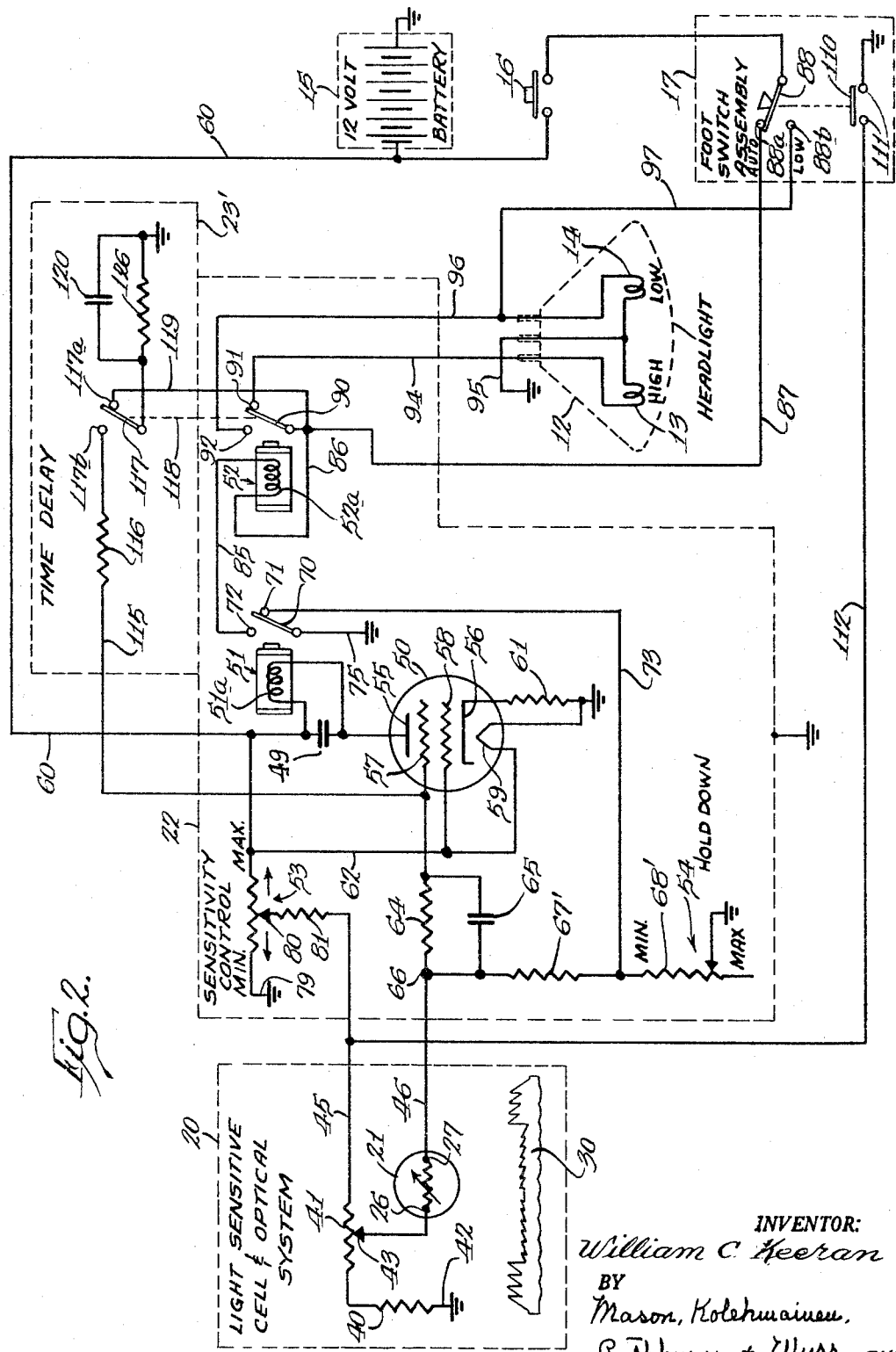

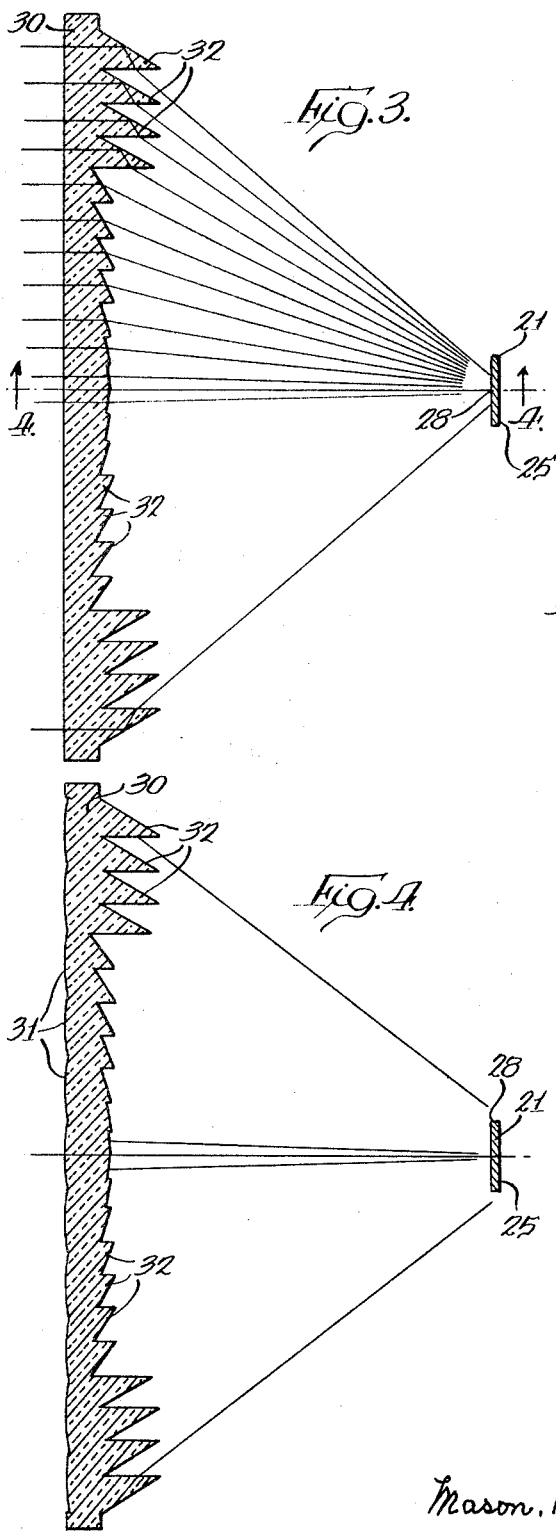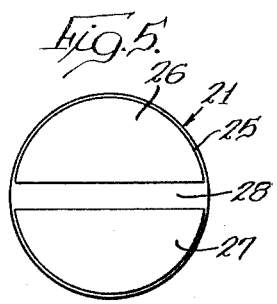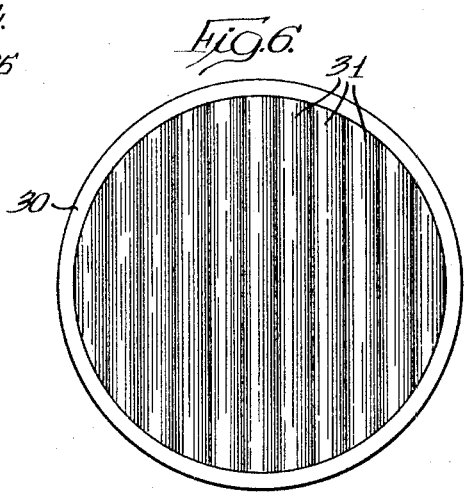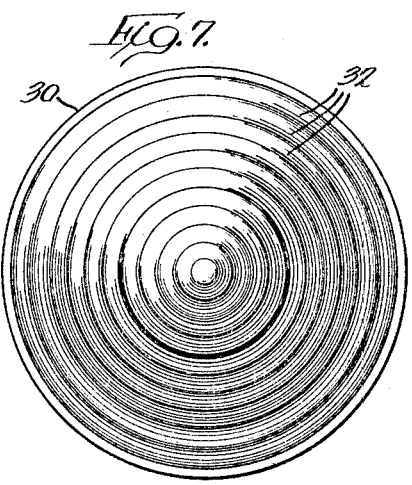

INVENTOR:
William C. Keeran
BY
Mason, Kolehmainen, Rathburn & Wyss
Attys

United States Patent Office 3,270,245
Patented August 30, 1966

3,270,245
AUTOMATIC HEADLIGHT DIMMER SYSTEM
William C. Keeran, Evanston, Ill., assignor to Vapor Corporation, Chicago, Ill., a corporation of Delaware
Original application June 6, 1960, Ser. No. 34,318, now Patent No. 3,177,397, dated Apr. 6, 1965. Divided and this application Feb. 1, 1965, Ser. No. 429,335
5 Claims. (Cl. 315—83)

The present application is a division of copending Keeran application Serial No. 34,318, filed June 6, 1960 now Patent No. 3,177,397, issued April 6, 1965, and assigned to the same assignee as the instant application. It relates to illumination control systems, and more particularly to light sensitive control circuits for automatically controlling the dimming of vehicular headlamps, commonly referred to as automatic headlight dimmers.

For many years automobiles have been provided with dual purpose headlights, i.e., the headlights are capable of operating as bright or driving lights, or as dimmed or deflected lights. The bright condition of such lights is variously referred to as the high beam, bright or driving condition, while the other condition is variously referred to as the dimmed, low beam or deflected condition. In the modern automobile separate filaments are provided in the headlights selectively to produce the condition, and to this end manually actuatable means (commonly foot actuated) are provided in such automobiles. This is to permit the driver to dim or downwardly deflect his driving lights to avoid the blinding glare otherwise imposed on the driver of the oncoming vehicle and, of course, for other purposes while still permitting him quickly to switch to his bright or high beam lights after the oncoming vehicle has passed. This manual operation becomes rather trying due to its being a highly repeated operation, particularly on heavily traveled highways. For many years attempts have been made to eliminate this highly repeated manual operation by providing arrangements for automatically operating the dimming system on an automobile. At least one such system has for some years been commercially available.

An ideally designed automatic headlight dimming system for automobile vehicles is one that automatically switches between the high and low beams of the headlights of the vehicle only at the right times to insure that the driver constantly has the best road visibility. It should provide high beam lighting for the maximum time, and at the correct time provide low beam lighting for best road visibility as the cars approach each other. Consequently, an ideal automatic headlight dimmer should operate primarily on the lights of other cars. It should dim when the approaching car with dim lights is approximately twelve hundred feet away. Moreover, for safety and courtesy, it should dim on tail lights when it approaches a car from the rear or when another car passes. But it should not be operated by other types of lights, such as street lights, caution lights flashing on and off, lighted store windows and store signs, lighted outdoor signs, reflecting route markers and the like, or when a string of cars passes across an intersection in front of the car equipped with an ideal automatic dimmer. Furthermore, such an ideal system should immediately restore the high beam lights when the oncoming vehicle has passed, and the switching operation from low to high beam or vice versa should occur only when necessary.

Unfortunately, the systems heretofore available have in no way approached the ideal. Either they fail to dim the lights when they should or they switch the lights from high to dim a number of times when this should not occur.

Most of the automatic dimming systems for vehicular headlamps have employed means for stepping up the voltage from that normally available in such vehicles to very high voltages and have included complicated amplifier arrangements and the like. The high voltages create a danger from the standpoint of the serviceman. Furthermore, many of these systems involve complicated optical systems which are expensive and generally unsatisfactory.

From the above discussion it will be appreciated that the requirements for an ideal automatic headlight dimming system are very stringent. It should have ample sensitivity to insure dimming at a desired distance; it should be provided with a delay action requiring a predetermned delay, such as three seconds before the bright lights can be restored following dimming thereof, and also it should include what might be termed a "hold-down" feature to prevent the restoration of the lights to the "bright" condition immediately after the predetermined delay so that the dimmed lights of the oncoming vehicle will prevent restoration of the bright lights; it should restore the lights to the "bright" condition within one half second after the light source which initiated the dimming action has been removed; it should be responsive to red lights so it dims on the tail lights of the car ahead; it should be simple and have a minimum of components so its cost is comparatively low; it should have means whereby its dim condition can be overriden by manual means in case it is momentarily necessary to manually flash your own lights from low beam to high beam to signal the oncoming driver that he should dim his own lights; it should operate on battery voltage so as to eliminate any electrical hazard to service personnel as well as to the driver; it should provide a uniform response to headlights or tail lights within an established optical acceptance pattern, and finally it should effectively screen out all objectionable light sources outside its optical acceptance pattern to eliminate unnecessary dimming from all other light sources.

Accordingly, it is an object of the present invention to provide a new and improved automatic headlight dimming system.

It is another object of the present invention to provide an automatic headlight dimming system meeting all of the requirements set forth above.

It is still another object of the present invention to provide an automatic headlight dimming system which is simple and compact, inexpensive to manufacture and install in a vehicle, and which is capable of operating correctly for every conceivable road and driving condition while retaining full flexibility of operation at the will of the operator of the vehicle.

It is a further object of the present invention to provide an improved optical system for an automatic headlight dimming system.

Still another object of the present invention resides in an improved delay mechanism for delaying the return of the lights to the high beam condition immediately following dimming thereof.

A still further object of the present invention resides in an improved "hold-down" arrangement for an automatic headlight dimming system.

It is another object of the present invention to provide an automatic dimming system for automobile headlights employing an improved optical system and an improved time delay mechanism.

Further objects and advantages of the present invention will become apparent as the following description proceeds, and the features of novelty which characterize the invention will be pointed out with particularly in the claims annexed to and forming a part of this specification.

For a better understanding of the present invention, reference may be had to the accompanying drawings in which:

FIG. 1 is a schematic diagram of one embodiment of the automatic headlight dimming system of the present invention;

FIG. 2 is a schematic diagram similar to FIG. 1 illustrating a modification thereof;

FIG. 3 is an enlarged sectional view through the optical portion of the system of FIG. 1 or 2 showing the relative positions of the light sensitive element and the remainder of the optical system and illustrating the vertical spread of light obtained by the optical system;

FIG. 4 is a sectional view taken on line 4—4 of FIG. 3, assuming that FIG. 3 shows the complete structure and illustrating schematically the horizontal spread of light obtained by the optical system;

FIG. 5 is a greatly enlarged front view of the light sensitive element embodied in the dimming system of the present invention showing the light sensitive area;

FIG. 6 is a front elevational view of the combined lens and light spreader embodied in the optical system of the present invention;

FIG. 7 is a rear view of the combined lens and light spreader of FIG. 6;

Figure 8:
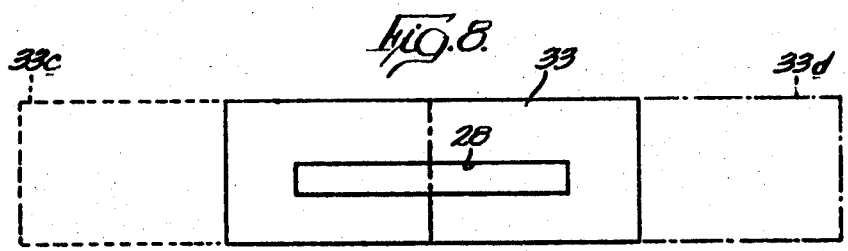
FIG. 8 is a greatly enlarged view of the light sensitive area of the light sensitive element showing the superimposed light pattern produced by the optical system of the present invention where the light source is on the optical axis in one case and then is displaced horizontally but not vertically.

Briefly, the present invention is concerned with an improved automatic dimming system for automobile headlights including an improved optical arrangement and an improved time delay device. The light sensitive element of the present invention is capable of operating directly from a twelve-volt storage battery now almost universally used in modern automobiles, thus eliminating means for building up a high voltage in the dimmer system. An improved optical arrangement is employed to insure that the system will not operate from side lights along the highway, from reflection of lights on the pavement, from overhead lighting; or, in other words, to insure operation only by oncoming headlights or tail lights of the car ahead. The system employs but a single electron discharge valve and two simple relays. An improved time delay means is provided which prevents cycling of the dimmer system and yet which provides no delay after an oncoming vehicle has passed the vehicle having the controlled dimming system.

Referring now to FIG. 1 of the drawings, there is illustrated an automobile dimming system which can be incorporated in any modern automobile having the conventional headlights one of which is schematically illustrated at 12, including high beam 13 and low beam 14. A suitable source of electrical energy which may comprise the conventional storage battery 15 is also illustrated. This has been indicated as a twelve-volt battery which means that the voltages available from the associated charging source will not exceed twenty volts. For simplifying the disclosure, only a single headlight 12 has been illustrated in the drawings, but it will be appreciated that the conventional automobile has two headlights, the second being connected in parallel with the first. Also, the schematic representation is intended to cover dual headlights as well as other types. Such an automobile would include a manual light switch schematically indicated at 16, and some sort of foot switch assembly schematically indicated at 17, which in the conventional automobiles now on the market is a manually actuatable foot switch and which, upon successive actuations thereof, alternately switches the headlights from high to low and from low to high. In accordance with the present invention, there is provided an optical system generally and schematically indicated by the reference numeral 20, which includes a light sensitive element 21. Additionally, there is provided an automatic dimming mechanism generally designated at 22, including a time delay mechanism generally designated at 23, which element interrelates the optical system 20, the headlights 12, battery 15 and the foot switch assembly 17.

Considering now the optical system of the present invention, there is illustrated in FIG. 5 the light sensitive element 21, which preferably is an area or layer type cell, which effectively is in the form of the variable resistance, the resistance of which decreases as the light which impinges on the light sensitive area thereof increases. In an embodiment built in accordance with the present invention, the light sensitive element comprised a so-called cadmium selenoid cell, which, as best shown in FIG. 5, comprised a circular disk 25, preferably formed of porcelain, three-sixteenths of an inch in diameter and presenting a circular face. On the face of this porcelain base member 25 there are placed a pair of conductive terminals 26 and 27, spaced apart a distance of twenty-five thousandths of an inch. In accordance with the present invention, this narrow horizontally disposed space between the terminals 26 and 27 is sprayed with powdered cadmium selenide, using a liquid carrying agent, after which the surface is heated to a predetermined level to vaporize the carrier and to fuse the cadmium selenide into a solid crystalline state. The light sensitive area of the cell 21, designated at 28, then comprises a narrow horizontal strip three-sixteenths of an inch in length and twenty-five thousandths of an inch in width.

In order to produce a light pattern relative to the sensitive area 28 of the light sensitive element 21 so that the optical system of the present invention will have the desired vertical and horizontal light acceptance, described in detail hereinafter, there is provided in accordance with the present invention a combined lens and light spreader generally designated at 30 in FIG. 1 and shown and described in greater detail hereinafter. As best shown in FIGS. 3, 4, 6 and 7, the combined lens and light spreader of the present invention is a molded unitary structure which may be made from glass or one of the transparent plastics, for example, an acrylic resin such as methyl methacrylate. The front surface, as best shown in FIGS. 4 and 6 of the drawings, is provided with a light spreader in the form of vertical flutes 31. The back of the combined lens and light spreader 30 is divided into concentric zones 32 each having a spherical surface of the proper curvature to reduce to a minimum longitudinal spherical aberration. Such a lens is generally called a Fresnel lens. In FIGS. 3 and 4, the light rays passing through the combined light spreader and lens are schematically indicated so as to produce on the focal plane of the light sensitive element 21 a light pattern which has an approximate four degrees vertical spread and an approximate fifteen degrees horizontal spread. In an embodiment built in accordance with the present invention, the lens 30 had a two inch diameter and was spaced approximately an inch from the light sensitive element 21, which resulted in a light pattern having a width of approximately one-quarter inch in the horizontal direction and a vertical height of the order of one-sixteenth inch.

Figure 9:
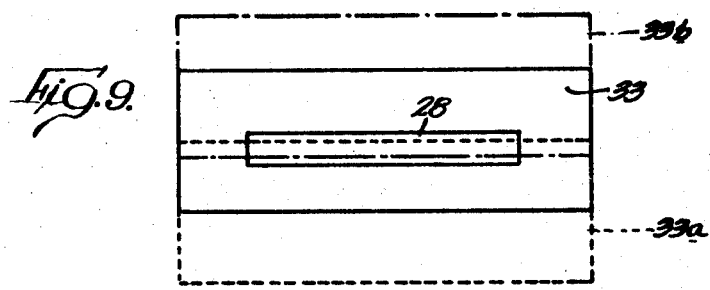
FIG. 9 is a greatly enlarged view similar to FIG. 8 but showing displacement of the light pattern in a vertical direction with no displacement in the horizontal direction.

In FIGS. 8 and 9 of the drawings, there is illustrated in solid lines the light sensitive area 28 greatly magnified, and in solid lines superimposed thereover the light pattern 33 applied to the light sensitive area when the light source producing this pattern is directed along the optical axis of the combined lens and light spreader 30. It will be apparent from FIGS. 8 and 9 that the horizontal axis of the light sensitive area 28 is located below the horizontal axis of the light pattern 33 when the light source is on the optical axis of the optical system. This is so that there will be available a greater latitude for movement of the light source above the optical axis than below to prevent undesirable tripping of the dimming system as by light reflected from the pavement. It will be appreciated that by virtue of the inversion produced by the combined light spreader and lens 30 any shift of the light source relative to the optical axis will cause a corresponding shift of the light pattern 33 but in an opposite direction. With the arrangement illustrated in FIG. 9, the light source can move two and one-quarter degrees above the optical axis, and one and three-quarters degrees below the optical axis without losing any coverage of the light sensitive area 28 by the light pattern 33 or, in other words, without losing any sensitivity. However, as indicated by the dashed lines designated by the reference numeral 33a, a movement of the light source of the order of two and three-quarters degrees above the optical axis will result in a downward movement of the light pattern 33 to the position 33a resulting in a reduction of sensitivity to fifty percent. Moreover, a movement of the light source above the optical axis to an extent of three and one-quarter degrees will cause light pattern 33 to move below the position 33a whereby the light source is completely out of the acceptance field of the light sensitive area 28. Similarly, as indicated by dashed and dotted lines 33b in FIG. 9 of the drawings, a movement of the light source to an extent of two and one-quarter degrees below the optical axis will cause the light pattern to assume position 33b with a resulting fifty percent reduction in sensitivity. If this downward movement of the light source reaches two and three-quarters degrees, the light source is completely out of the acceptance field of the light sensitive area 28. This arrangement is very desirable and, as mentioned above, insures that reflection of the headlights from the pavement or reflection of overhead lights from the pavement will not trigger the automatic dimming apparatus. Similarly, overhead flashing caution lights or overhead street lights will not in any way affect the light sensitive area and, hence, trigger the automatic dimming circuit.

It is very essential that the automatic dimming system be unaffected by side lighting along the highway which might be produced by many different light sources, such as store lighting, advertising signs, street lights, lights from a string of cars passing in front of the controlled car at an intersection or the like. To this end it has been established that the sensitivity of the light sensitive element should be reduced to fifty percent when the optical axis of the light source shifts to the right or the left by seven and one-half degrees, and should be reduced to zero whenever a shift of fifteen degrees to the right or left occurs. In FIGS. 8 of the drawings there is illustrated in dotted lines, designated as 33c, a shift of the light source to the right of the optical axis by an angle of seven and one-half degrees. A shift of the light source to the left of the optical axis by an angle of seven and one-half degrees is designated by dash-dot lines 33d in FIG. 8 of the drawings. If the light source shifts to the right or the left by an angle of fifteen degrees, it will be appreciated that the light pattern 33 will be completely to one side or the other of light sensitive area 28 and the sensitivity to such light source will be zero.

Figure 10:
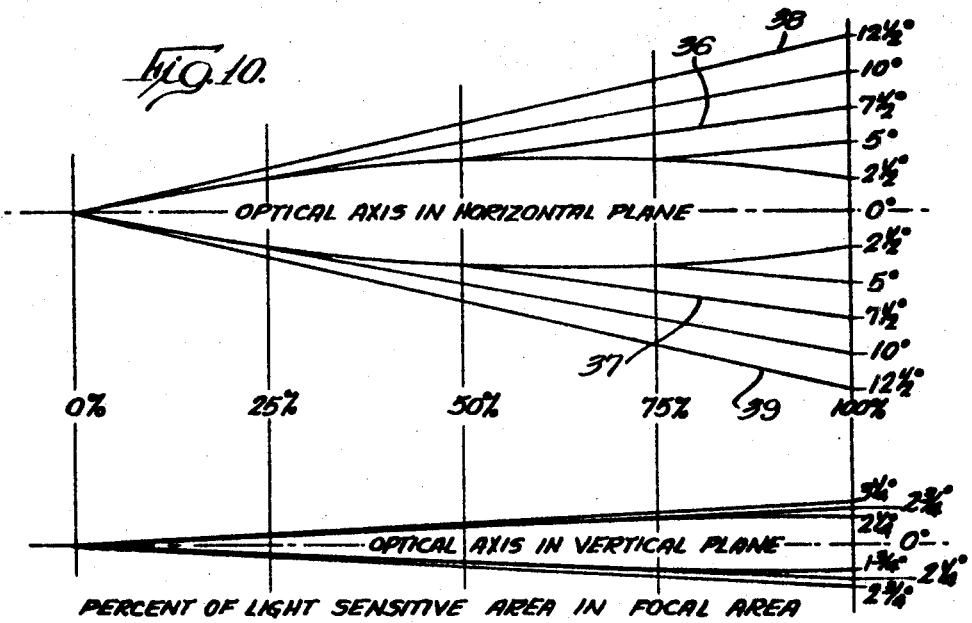
FIG. 10 is a graph setting forth the percentage of the light sensitive area which is effective for various vertical and horizontal angular displacements of the light source.

In FIG. 10 of the drawings there is illustrated in graph form the percentage of the light sensitive area 28 in the focal area of the light pattern 33 when the light source is located at various horizontal and vertical angles relative to the optical axis. This table shows that with a fifteen degree total horizontal acceptance angle (seven and one-half degrees on either side), represented by lines 36 and 37 in FIG. 10 of the drawings, the light sensitive area is only fifty percent effective. Moreover, with a total horizontal acceptance angle of twenty-five degrees, represented by the lines 38 and 39, the light sensitive area 28 is completely uncovered by the light pattern and, therefore, the light source is displaced beyond the point in which it has any effect on the automatic dimming system of the present invention. This insures that side lighting will not undesirably trigger the dimming system.

The lower portion of FIG. 10 clearly shows what occurs as far as vertical displacement of the light source relative to the optical axis is concerned. It will be appreciated that the reason a greater acceptance for horizontal deviation is necessary is due to the fact that highways curve at angles substantially greater than the normal change in grade of these highways.

For the specific optical system described above, there is set forth in the table below the vertical and horizontal deviation in feet of the light source from the optical axis at various angles and distances (in feet) relative to the light sensitive area 28.

| Distance Between Light Source and Light Sensitive Area 28 | Deviation of Light Source in Feet From Optical Axis | | | | |
|---|---|---|---|---|---|
| | Vertical | | | Horizontal | |
| | At 1½° | At 2° | At 2½° | At 7½° | At 15° |
| 50 | 1.3 | 1.7 | 2.2 | 6.6 | 13.4 |
| 100 | 2.6 | 3.5 | 4.4 | 13.2 | 26.8 |
| 250 | 6.6 | 8.7 | 10.9 | 32.9 | 67.0 |
| 500 | 13.1 | 17.5 | 21.9 | 65.9 | 134.0 |
| 750 | 19.7 | 26.2 | 32.8 | 98.8 | 200.9 |
| 1,000 | 26.2 | 34.9 | 43.7 | 131.7 | 268.0 |
| 1,250 | 32.8 | 43.6 | 54.6 | 164.6 | 334.9 |
| 1,500 | 39.3 | 52.4 | 65.6 | 197.6 | 401.9 |
| 2,000 | 52.4 | 69.8 | 87.4 | 263.4 | 535.8 |
| 2,500 | 65.5 | 87.3 | 109.3 | 329.3 | 669.8 |
| 3,000 | 78.6 | 104.7 | 131.1 | 395.1 | 803.7 |

In order that the optical system 20 may be selectively adjusted so that the light sensitive element 21 will trigger the dimming system when an oncoming vehicle approaches to within a preselected distance, there is provided what might be termed a "customer selectivity" adjustment in the form of a voltage divider comprising serially arranged resistors 40 and 41 which have a grounded terminal 42. The terminal 26 of the light sensitive element 21 is connected by means of a variable tap 43 to the resistor 41 whereby the voltage applied to the light sensitive element 21 may be adjusted for proper sensitivity.

The optical system 20 of the present invention is electrically connected by conductors 45 and 46 to the automatic dimming mechanism 22, conductor 46 being connected to terminal 27 of the light sensitive element 21, and conductor 45 being connected to one terminal of the resistor 41. One or more of these conductors 45 or 46 may be in the form of a coaxial cable, if desired.

The automatic dimming mechanism generally indicated at 22, in addition to the time delay mechanism 23, comprises as its essential elements an electron discharge valve 50, a pilot or first relay 51, a slave relay 52 which, in effect, is a power or second relay, a factory adjustable sensitivity control 53 and a hold-down control 54. As illustrated in FIG. 1 of the drawings, the electron discharge valve 50 includes an anode 55, a cathode 56, a screen grid 57 and a control electrode 58. The conventional hot filament 59 is also illustrated. The plate circuit of the electron discharge valve 50 is connected to the positive terminal of the battery 15 by a conductor 60 through the winding 51a of the pilot relay 51 and to ground through a plate circuit resistor 61. The negative terminal of the battery 15 is, of course, also grounded. A suitable smoothing capacitor 49 is illustrated as being connected across winding 51a. The filament circuit for the electron discharge valve 50 is connected to the battery 15 through conductor 60 and a conductor 62. The control electrode 58 is also connected to the conductor 62 and, hence, to the positive terminal of the battery 15.

In order that the winding 51a of the pilot relay 51 is normally de-energized when the light sensitive element 21 is not subjected to light equivalent to that of the headlights of an oncoming car, the screen grid 57 is connected to terminal 27 of the light sensitive element 21 through conductor 46 and a resistor 64. A suitable smoothing capacitor 65 is connected across resistor 64. Furthermore, one terminal 66 of resistor 64 is connected to ground through a fixed resistor 67 and a variable resistor 68, thereby defining a voltage divider for controlling the potential applied to screen grid 57. The resistors 67 and 68 provide the hold-down control 54 referred to above.

To increase the sensitivity of the dimming circuit when relay 51 is energized, the latter is provided with a movable contact or switching element 70 for selectively engaging a normally closed or high beam contact 71 or a normally open or low beam contact 72. The normally closed contact 71 forms a part of the hold-down control and is connected by a conductor 73 to the common terminal between resistors 67 and 68. The switching element 70 is connected to ground by a conductor 75. It will be apparent that normally the terminal 66 of resistor 64 is connected to ground through resistor 67, conductor 73, switch arm 70, and conductor 75. However, when electron discharge valve 50 is rendered sufficiently conductive to cause energization of pilot relay 51, the circuit is opened at normally closed contact 71, and the variable resistor 68 is inserted in the ground circuit of the terminal 66 of resistor 64. With this arrangement the sensitivity is increased when pilot relay 51 is energized, and this is so that when pilot relay 51 is energized less light is necessary on light sensitive element 21 to maintain the energization of pilot relay 51. It will be appreciated that when two vehicles are approaching each other, both with their headlights in the high beam position, relay 51 is energized to initiate the dimming action by virtue of the oncoming bright headlights. Usually, the driver of the oncoming vehicle dims his lights, and it is important that this decrease in light will not permit the lights controlled by the light sensitive element 21 to be restored to the bright condition. By virtue of the increased sensitivity, which increase could be manyfold, relay 51 will not be de-energized. The adjustable resistor 68 permits adjustment of the hold-down desired.

In order that the sensitivity of the automatic dimming system may be satisfactorily adjusted aside from the customer adjustment in the optical system 20, there is provided the sensitivity control 53 described above, including a potentiometer 78 connected across battery terminals 15 through conductor 60. This potentiometer includes a variable tap 80 connected to conductor 45 through a resistor 81. With this arrangement the potential applied to the light sensitive element 21 can be adjusted. It will be appreciated that the light sensitive element 21 is effectively a variable resistor in the screen grid to cathode circuit of electron discharge valve 50.

To selectively render either the high filament 13 or the low filament 14 of the headlight 12 effective, the slave relay 52 having winding 52a is provided. The winding 52a has one terminal thereof connected by a conductor 85 with the normally open contact 72 of pilot relay 51. The other terminal of winding 52a of slave relay 52 is connected by a conductor 86 and a conductor 87 through the "automatic" contact 88a and a switch member 88 of the foot switch assembly 17, through manually actuated light switch 16 to the positive terminal of battery 15. It will be appreciated, then, that whenever switching element 70 of pilot relay 51 engages normally open low beam contact 72 the slave relay 52 will be energized, of course assuming that switch 88 of the foot switch assembly 17 is in engagement with "automatic" contact 88a as shown.

Slave relay 52 is a switching relay for automatically switching the headlights such as 12 between the high and low beam conditions thereof. As illustrated, slave relay 52 includes a switching element 90 which in the unenergized condition of the relay engages normally closed contact 91, which is designated as the high beam contact, and when energized engages normally open contact 92, which is designated as the low beam contact. Switching element 90 is connected to conductor 87 and, hence, to the positive terminal of battery 15 through foot switch element 88 when engaging the "automatic" contact 88a. High beam contact 91 is connected by conductor 94 to one terminal of high beam filament 13, the other terminal of which is connected to a ground conductor 95. The low beam filament 14, on the other hand, has one terminal thereof connected to the ground conductor 95, while the other terminal thereof is connected by a conductor 96 to the low beam contact 92 of slave relay 52. This terminal of low beam filament 14 connected to conductor 96 is also connected by a conductor 97 with the low beam contact 88b of the foot switch assembly 17. Consequently, if the foot switch element 88 is in the "automatic" position shown in FIG. 1 of the drawings, the headlight 12 will be in its low or high beam condition depending, respectively, upon whether relay 52 is energized or de-energized.

If the automatic dimming system is triggered so as to switch the lights from the high to the low beam condition, it is important that they do not immediately return to the high beam condition, and to this end a suitable delay device 23 is provided. This time delay device will insure a predetermined delay, such as a three-second delay, but will further insure that when the oncoming vehicle has passed this delay will not preclude the lights from being immediately restored to the high beam condition. In accordance with the present invention, the time delay device 23 includes a thermal switching device comprising a pair of relatively movable contacts 100 and 101 which are held in the closed circuit position (shown in FIG. 1 of the drawings) by an expansible element 103 which is generally referred to as a "hot wire" resistor. The flow of current through the hot wire resistor causes expansion thereof and opening of the contacts 100 and 101 which are serially connected with the hot wire 103. The contact 100 is connected by a conductor 104 and a current limiting resistor 105 to the normally open or low beam contact 72 of pilot relay 51, which is also one terminal of the winding of slave relay 52. The common terminal between contacts 100 and 101 and the hot wire 103 is connected to ground as indicated at 106. The other terminal of the hot wire 103 is connected through an adjustable resistor 107 and a fixed resistor 108 with the low beam contact 92 on slave relay 52. It will be understood that a warp switch may be employed in place of the hot wire controlled switch described above.

It will be apparent that when the relays 51 and 52 are de-energized, which means that the lights are in the high beam position, assuming that foot switch element 88 is in the "automatic" position and switch 16 is closed, no current flows through hot wire 103. However, current may flow from battery 15 through manual switch 16, foot switch assembly 17 when in the "automatic" position, conductor 87, winding 52a of slave relay 52, resistor 105, conductor 104, time delay switch contacts 100 and 101, to ground 106. Nevertheless, due to the magnitude of the current limiting resistor 105, this current is insufficient to energize slave relay 52. But when slave relay 52 is energized by the closing of normally open contact 72 of pilot relay 51 to cause switching element 90 to engage low beam contact 92, then, even though pilot relay 51 is immediately de-energized, the current through the circuit described above including resistance 105 is sufficient to maintain slave relay 52 in the energized condition. However, while in this energized condition, it will be apparent that current will also flow from battery 15 through conductor 87, low beam contact 92, resistor 108, resistor 107, and hot wire 103 to ground 106. This will cause heating and expansion of hot wire 103 to permit the circuit to be opened at contacts 100 and 101. The magnitude of the resistance of resistors 107 and 108 will control the time delay involved before the switch comprising contacts 100 and 101 is opened. By virtue of the adjustable feature of resistor 107, this time delay can be selectively adjusted. Thus, if for some reason the pilot relay 51 and slave relay 52 are energized to switch the lights from the high beam to the low beam condition, a predetermined time delay such as three seconds must elapse before they can be restored to the high beam condition even though pilot relay 51 is immediately de-energized. In the case of the dimming system being operated by an oncoming car, it will be apparent that this three-second time delay is of such magnitude as to be dissipated by the time the oncoming car has passed, so that the switching contacts 100 and 101 will have opened before the car has passed with the result that upon de-energization of pilot relay 51 slave relay 52 will immediately be de-energized.

The operator of an automobile, when relying on his automatic headlight dimmer, should nevertheless be able manually to control the same in situations such as where the oncoming driver fails to dim his lights. In that case it might be desirable to signal by switching the lights momentarily to the high position. To this end the foot switch assembly includes a movable switching member 110 which may bridge contacts 111, and by virtue of a conductor 112 may apply ground potential to the terminal 26 of light sensitive element 21, which would result in immediate de-energization of the relays 51 and 52 providing the three-second time delay has elapsed and, consequently, in the return of the lights to the bright condition. It will be appreciated that the three-second delay is so short that as a practical matter it would have elapsed before the operator would attempt to flash the oncoming car. Preferably, the switching element 110 may be incorporated in the foot switch assembly so that slight actuation of this foot switch, regardless of the position of switching element 88, would actuate switching element 110.

It will be understood that various circuit arrangements and various circuit constants may be employed in connection with the system shown in FIG. 1 of the drawings. However, in order to illustrate the relative magnitudes of the principal elements of a typical circuit arrangement which has been found to embody satisfactorily the present invention, the following approximate values of such elements together with other pertinent information are given for a particular device. It should be understood that these values are given by way of example only and not by way of limitation:

| | | |
|---|---|---|
| Resistor 40 | ohms | 22,000 |
| Resistor 41 | do | 20,000 |
| Capacitor 49 | mfd | 10 |
| Electron discharge valve 50 | | 12K5 |
| Resistor 64 | ohms | 470,000 |
| Capacitor 65 | mfd | ½ |
| Resistor 67 | megohms | 2.2 |
| Resistor 68 | do | 5 |
| Resistor 78 | ohms | 5,000 |
| Resistor 81 | do | 1,200 |
| Resistor 105 | do | 560 |
| Resistor 107 | do | 100 |
| Resistor 108 | do | 15 |

In view of the detailed description included above, the operation of the arrangement shown in FIG. 1 will readily be understood by those skilled in the art. The optical system as described above insures the proper acceptance angle, both vertically and horizontally, to eliminate undesirable tripping of the dimmer circuit by side lights, overhead lights and the like. When the light on the light sensitive element 21 increases, thus decreasing the resistance of the cell, the electron discharge valve 50 is rendered sufficiently conductive to cause energization of the pilot relay 51, which in turn energizes the power relay 52, shifting the headlamps from the high to the low beam position, assuming that the foot switch assembly is in the automatic position shown in FIG. 1 of the drawings. The energization of the pilot relay 51 opens the circuit at contact 71 thus placing resistor 68 in the circuit and, hence, insuring increased sensitivity of the system so that dimming of the oncoming lights will not permit the high beam to be restored. Furthermore, even though the source of light impinging on the light sensitive element is immediately removed, de-energizing pilot relay 51, the slave or power relay 52 will remain energized for a predetermined time such as three seconds by virtue of the time delay circuit 23. However, as soon as the hot wire 103 is heated sufficiently, the energization circuit for slave relay 52 will be interrupted at contacts 100 and 101.

In the event it is desired to have bright lights after the lights have been shifted to the dim condition, the operator may merely actuate the foot switch assembly 17 to close the contacts 111 and the high beam lights will be restored immediately following the elapse of the three-second delay. The foot switch assembly 17 also permits changing from the automatic position to the low beam position where contact 88b is effective.

Although in FIG. 1 of the drawings there has been illustrated an electron discharge tube, it should be understood that transistors or similar devices might be employed and it is intended by the term electron discharge device to include transistors as well as vacuum tubes and the like.

In FIG. 2 of the drawings there has been illustrated a modification of the invention, which modification is primarily with respect to the time delay device which, in FIG. 2, is designated by the reference numeral 23′. Except for the magnitude of the resistors 67 and 68 which, in FIG. 2, are designated as 67′ and 68′, the remainder of the circuit is identical to that shown in FIG. 1, and the corresponding parts are designated by the same reference numerals.

The time delay arrangement 23′ of FIG. 2 of the drawings comprises adding a switching member 117 to the slave or power relay 52, which switching member is operatively connected to the relay armature by member 118. The switching member 117 is adapted to engage normally closed contact 117a when the relay 52 is de-energized, or to engage normally open contact 117b when the relay 52 is energized. The normally open contact 117b is connected through a resistor 116 and a conductor 115 to the screen grid 57 of electron discharge valve 50. The normally closed contact 117a is connected by conductor 119 to the switching member 90 as well as to conductor 87 and to one terminal of the winding 52a of slave relay 52. The switching member 117 is connected to ground through an electrolytic capacitor 120, which capacitor is parallelled by a bleed resistor 126. It will be appreciated that when the slave relay 52 is de-energized, the capacitor 120 is charged with the full battery voltage through switch 16, foot switch member 88 and contact 88a, conductor 87, conductor 119, contact 117a, switching member 117, and capacitor 120 to ground. When the slave relay 52, which in effect is a power relay, is energized, switching member 117 engages normally open contact 117b and the charge on capacitor 120 is released through resistor 116 to the screen grid 57 of electron discharge valve 50, maintaining this valve conductive for a predetermined time such as three seconds regardless of the light condition on the photocell 21. During this period the capacitor 120 also bleeds off to ground through bleed resistor 126. This bleed resistor 126 also prevents a charge from building up on capacitor 120 through conductor 60, sensitivity control 53, light sensitive cell 21, resistor 64, conductor 115 and resistor 116. Thus, the instant the oncoming car has passed, there is no charge left on capacitor 120, so that the relays 51 and 52 are immediately restored to their de-energized positions, with the resultant restoration of the high beam lights. With this arrangement the time delay starts as soon as the lights shift from the high to the low beam condition, and this time delay is completely dissipated by the time the oncoming vehicle has passed. To illustrate the relative magnitudes of the principal elements of the circuits shown in FIG. 2 where they differ from FIG. 1, the following approximate values for such elements are given. It should be understood that these values are given by way of example only and not by way of limitation:

| | | |
|---|---|---|
| Resistor 67' | megohms | 2.7 |
| Resistor 68' | do | 10 |
| Resistor 116 | do | 10 |
| Capacitor 120 | mfd | 10 |
| Resistor 126 | ohms | 150,000 |

In view of the detailed description included above, the operation of the circuit of FIG. 2 will be substantially the same as that already described with respect to FIG. 1. As with FIG. 1, the three-second or other desired time delay insures against undesirable cycling of the dimmer circuit, but further insures that the high beam lights will be restored immediately upon passing the oncoming vehicle.

While there have been shown and described particular embodiments of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. In a headlight dimming system for vehicles having a headlight with a high beam filament, a low beam filament and a source of electric energy for energizing said filaments, the combination of a light sensitive element responsive to illumination impinging thereon, an electron discharge valve having electrodes including a grid, said light sensitive element being coupled to the grid of said valve for placing said valve in a first condition of operation when the level of incident light is low and for placing said valve in a second condition of operation in response to an increase in the light level, relay means responsive to the condition of the valve for energizing the high beam filament in the first condition of the valve and for energizing the low beam filament in the second condition of the valve, and time delay means for maintaining energization of the low beam filament for a predetermined time after an increase in the light level regardless of the subsequent light level, said time delay means comprising a capacitor, means for charging said capacitor when the high beam filament is energized, means for coupling said charged capacitor to the grid upon energization of the low beam filament for maintaining said valve in the second condition, and means including a bleed resistor for discharging said capacitor to allow said valve to return to the first condition in response to a decrease in the light level after a predetermined time, said coupling means including a resistor substantially larger than said bleed resistor.

2. In a headlight dimming system for vehicles of the type having a headlight with a high beam filament a low beam filament and a source of electric energy for energizing said filaments, the combination of a light sensitive element responsive to illumination impinging thereon, an electron discharge valve having electrodes including a grid, said light sensitive element being connected in circuit with said grid, a first relay having a winding connected in the plate circuit of said valve and in series with said source, said first relay having a normally open and a normally closed contact, a second relay having a winding connected in series with said normally open contact so as to be energized upon energization of said first relay, means for energizing one of said filaments upon de-energization of said second relay, means for energizing the other of said filaments upon energization of said second relay, and time delay means comprising a charged capacitor and a resistor, said second relay including means for connecting said charged capacitor and said resistor to said grid upon energization of said second relay for preventing said second relay from being de-energized for a predetermined time after being energized regardless of the light condition to which said light sensitive element is subjected.

3. In a headlight dimmer for vehicles having a headlight with a high beam filament a low beam filament and a source of electric energy for energizing said filaments, the combination of a light sensitive element responsive to illumination impinging thereon, an electron discharge valve having electrodes including a grid, means for connecting said light sensitive element to said grid, sensitivity control means for adjusting the sensitivity of said dimmer, a first relay having a winding connected in the plate circuit of said valve and in series with said source, a second relay for energizing one of said filaments when energized and energizing the other of said filaments when de-energized, means for energizing said second relay upon energization of said first relay, means for increasing the sensitivity of said dimmer upon energization of said first relay, and time delay means comprising a charged capacitor and a resistor, said second relay including means for connecting said charged capacitor and said resistor to said grid upon energization of said second relay for preventing said second relay from being de-energized for a predetermined time after being energized regardless of the light condition to which said light sensitive element is subjected.

4. In a headlight dimming system for vehicles having a headlight with a high beam filament a low beam filament and a source of electric energy for energizing said filaments, the combination of a light sensitive element responsive to illumination impinging thereon, relay means including a relay winding for energizing one of said filaments when actuated by current flow through said winding and energizing the other of said filaments when not actuated by current flow through said winding, means for actuating said relay means in response to a predetermined illumination of said light sensitive element, and time delay means including a thermally controlled switch and current limiting resistor for preventing said relay means from being effectively de-energized for a predetermined time after being actuated regardless of the light condition to which said light sensitive element is subjected, said thermally controlled switch and current limiting resistor being connected in series with each other and in series with said winding whenever said high beam filament is energized, said resistor limiting the current flow through said winding to such an extent as to prevent the effective energization of said relay means but permitting sufficient current flow to maintain said relay means in actuated condition once actuation thereof has occurred.

5. The headlight dimming system of claim 4 wherein said thermally controlled switch includes contact means and an expansible wire holding said contact means in closed position, said contact means being connected in series with said relay winding and said source, and means responsive to energization of said relay means to cause current to flow through said expansible wire thereby to open the circuit at said contact means and de-energize said relay means after a predetermined delay.

References Cited by the Examiner

UNITED STATES PATENTS

| | | | |
|---|---|---|---|
| 2,476,382 | 7/1949 | Phillus | 315—83 |
| 2,560,748 | 7/1951 | Silva | 315—83.1 |
| 2,718,612 | 9/1955 | Willis | 317—130 |
| 2,840,758 | 6/1958 | Miller | 315—83 |
| 3,011,092 | 11/1961 | Deuth | 315—83.1 |
| 3,089,065 | 5/1963 | Worden | 317—130 |

J. LAWRENCE, *Primary Examiner.*

GEORGE N. WESTBY, *Examiner.*

R. JUDD, *Assistant Examiner.*